United States Patent
Suitou et al.

(10) Patent No.: US 9,879,666 B2
(45) Date of Patent: Jan. 30, 2018

(54) MOTOR DRIVEN COMPRESSOR

(71) Applicant: KABUSHIKI KAISHA TOYOTA JIDOSHOKKI, Kariya-shi, Aichi-ken (JP)

(72) Inventors: Ken Suitou, Aichi-ken (JP); Yusuke Kinoshita, Aichi-ken (JP); Tsuyoshi Yamaguchi, Aichi-ken (JP)

(73) Assignee: KABUSHIKI KAISHA TOYOTA JIDOSHOKKI, Aich-ken (JP)

( * ) Notice: Subject to any disclaimer, the term of this patent is extended or adjusted under 35 U.S.C. 154(b) by 414 days.

(21) Appl. No.: 13/652,841

(22) Filed: Oct. 16, 2012

(65) Prior Publication Data

US 2013/0108485 A1   May 2, 2013

(30) Foreign Application Priority Data

Oct. 31, 2011   (JP) ................................ 2011-239305

(51) Int. Cl.
*F04B 39/12* (2006.01)
*H02K 5/22* (2006.01)
(Continued)

(52) U.S. Cl.
CPC ............ *F04B 39/121* (2013.01); *F04B 27/14* (2013.01); *F04B 39/06* (2013.01); *F04C 23/008* (2013.01);
(Continued)

(58) Field of Classification Search
CPC ...... F04B 53/16; F04B 53/001; F04C 23/008; H02K 5/225; H02K 29/08
(Continued)

(56) References Cited

U.S. PATENT DOCUMENTS 5,777,847 A * 7/1998 Tokuno .................. H01L 23/10
                                                   257/713
8,451,611 B2 * 5/2013 Nakagami ............... F04B 39/06
                                                   165/104.33
(Continued)

FOREIGN PATENT DOCUMENTS

EP   1 382 847 A2   1/2004
EP   1 450 044 A2   8/2004
(Continued)

OTHER PUBLICATIONS

Extended European Search Report for corresponding Patent Application No. EP 12188612.1 dated Mar. 12, 2013.
(Continued)

*Primary Examiner* — Devon Kramer
*Assistant Examiner* — Lilya Pekarskaya
(74) *Attorney, Agent, or Firm* — Sughrue Mion, PLLC

(57) ABSTRACT

A motor-driven compressor includes a compression mechanism compressing refrigerant gas, an electric motor driving the compression mechanism, a housing made of a thermally conductive material and accommodating the compression mechanism and the electric motor and an inverter assembly controlling rotation of the electric motor. The inverter assembly includes an elastic member made of a thermally conductive material and disposed in contact with the housing, a circuit board supported directly by the elastic member, an electronic part mounted on the circuit board and a base member made of a thermally conductive material, fixed to the housing and having a closed end. The base member fixes the electronic part. The base member and the housing cooperate to form an accommodation space that accommodates the elastic member, the circuit board and the electronic part. The closed end of the base member and the elastic member forms therebetween a space.

4 Claims, 3 Drawing Sheets

(51) Int. Cl.
*H02K 5/18* (2006.01)
*F04B 27/14* (2006.01)
*F04C 23/00* (2006.01)
*F04B 39/06* (2006.01)
*F04C 29/04* (2006.01)
*F04C 18/02* (2006.01)
*H02K 11/33* (2016.01)
*H02K 29/08* (2006.01)
*H02K 9/22* (2006.01)

(52) U.S. Cl.
CPC .......... *H02K 11/33* (2016.01); *F04C 18/0215* (2013.01); *F04C 29/04* (2013.01); *F04C 2240/803* (2013.01); *F04C 2240/808* (2013.01); *F04C 2270/12* (2013.01); *H02K 5/18* (2013.01); *H02K 5/225* (2013.01); *H02K 9/22* (2013.01)

(58) Field of Classification Search
USPC ................. 417/410.1; 310/68 R, 44
See application file for complete search history.

(56) References Cited

U.S. PATENT DOCUMENTS

| | | | |
|---|---|---|---|
| 2002/0025265 A1 | 2/2002 | Ikeda | |
| 2004/0009078 A1* | 1/2004 | Kimura | F04C 23/008 417/410.5 |
| 2004/0013544 A1 | 1/2004 | Kimura et al. | |
| 2004/0075986 A1* | 4/2004 | Schwarz | H05K 7/20472 361/704 |
| 2005/0063836 A1* | 3/2005 | Kimura | F04B 39/121 417/313 |
| 2007/0231165 A1 | 10/2007 | Koide et al. | |
| 2009/0010786 A1* | 1/2009 | Koide | F01C 21/10 417/423.14 |
| 2011/0193452 A1* | 8/2011 | Yakushiji | F04B 39/06 310/68 D |
| 2011/0236235 A1* | 9/2011 | Hattori | B60H 1/3222 417/410.1 |
| 2011/0256002 A1 | 10/2011 | Ikeda | |
| 2012/0063935 A1* | 3/2012 | Fujimura | F04B 39/121 417/410.1 |

FOREIGN PATENT DOCUMENTS

| | | |
|---|---|---|
| EP | 1840378 A2 | 10/2007 |
| JP | 2002-70743 A | 3/2002 |
| JP | 2004-44535 A | 2/2004 |
| JP | 2004-251161 A | 9/2004 |
| JP | 3804589 B2 | 8/2006 |
| JP | 2007-263061 A | 10/2007 |
| JP | 2007-306671 A | 11/2007 |
| JP | 2010-144607 A | 7/2010 |
| JP | 2010285980 A * | 12/2010 |
| JP | 4665825 B2 | 4/2011 |

OTHER PUBLICATIONS

Communication dated Dec. 3, 2014 from the State Intellectual Property Office of the People's Republic of China in counterpart application No. 201210425302.4.

* cited by examiner

MOTOR DRIVEN COMPRESSOR

BACKGROUND OF THE INVENTION

The present invention relates to a motor-driven compressor that includes an inverter assembly.

Generally, a motor-driven compressor includes a compression mechanism compressing refrigerant gas, an electric motor driving the compression mechanism and an inverter assembly controlling the rotation of the electric motor. The inverter assembly has therein a circuit board on which electronic parts forming an inverter circuit are mounted.

During the operation of the motor-driven compressor, the electronic parts mounted on the circuit board of the inverter assembly generate heat and the operation of the compression mechanism causes the circuit board to be vibrated. For protecting the electronic parts on the circuit board from such heat and vibration, the inverter assembly is disposed on the outer surface of a compressor housing that is adjacent to a passage through which low-temperature and low-pressure refrigerant gas just introduced into the compressor housing flows and, additionally, thermally conductive and elastic resin is provided in the inverter assembly. In operation of the motor-driven compressor, the heat generated by the electronic parts is transferred through the resin to the housing and released therefrom. The vibration caused by the compression mechanism is absorbed by the resin.

Japanese Patent Application Publication 2004-251161 discloses a motor-driven compressor whose inverter assembly is mounted on the outer surface of the compressor housing adjacent to a passage of low-temperature and low-pressure refrigerant gas. Furthermore, a support member made of resin is interposed between the closed end of the inverter assembly and a circuit board in the inverter assembly and additionally a thermally conductive and elastic rubber sheet is interposed between electric parts mounted on the circuit board and the outer surface of the compressor housing. During the operation of the motor-driven compressor, the heat generated by the electric parts is transferred through the thermally conductive and elastic rubber sheet to the outer surface of the compressor housing and released therefrom and the vibration caused by the compression mechanism is absorbed by the thermally conductive and elastic rubber sheet.

In a conventional case where resin is provided in the entire interior of the inverter assembly of the compressor, a large amount of resin need be used and an air hole be formed through housing of the inverter assembly for preventing pressure change in the inverter assembly occurring due to temperature increase, with the result that material and the manufacturing costs of the inverter assembly increase. In the case of the inverter assembly of the motor-driven compressor according to the above Publication which uses the support member made of resin and the thermally conductive and elastic rubber sheet, the heat generated by the electronic parts can be released to the compressor housing through the rubber sheet, but the heat transferred from the electronic parts to the circuit board can not be released to the compressor housing, so that high radiation efficiency can not be achieved.

The present invention is directed to providing a motor-driven compressor with an inverter assembly that is less costly than heretofore and offers high radiation performance and vibration resistance.

SUMMARY OF THE INVENTION

A motor-driven compressor includes a compression mechanism compressing refrigerant gas, an electric motor driving the compression mechanism, a housing made of a thermally conductive material and accommodating the compression mechanism and the electric motor and an inverter assembly controlling rotation of the electric motor. The inverter assembly includes an elastic member made of a thermally conductive material and disposed in contact with the housing, a circuit board supported directly by the elastic member, an electronic part mounted on the circuit board and a base member made of a thermally conductive material, fixed to the housing and having a closed end. The base member fixes the electronic part. The base member and the housing cooperate to form an accommodation space that accommodates the elastic member, the circuit board and the electronic part. The closed end of the base member and the elastic member forms therebetween a space.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
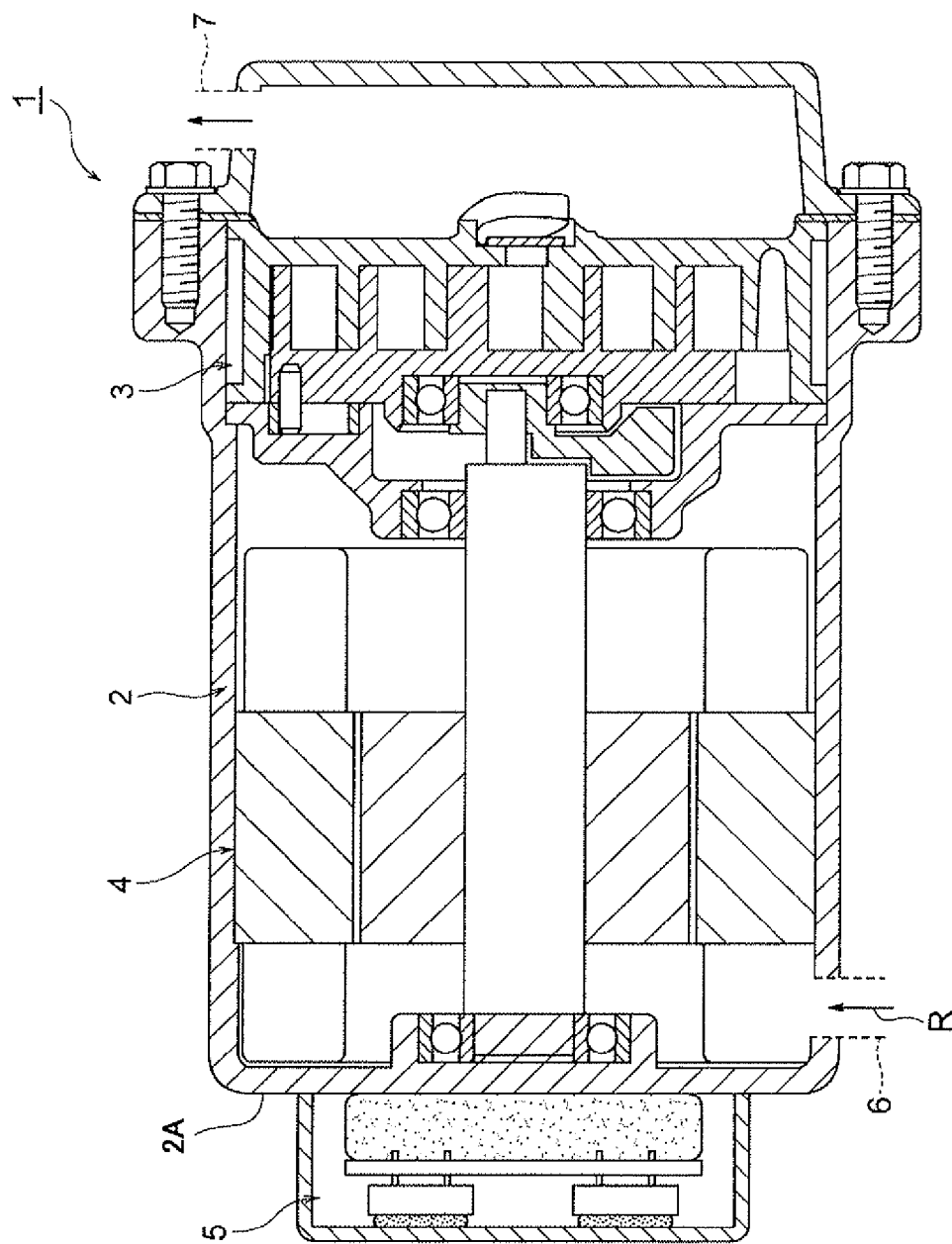
FIG. 1 is a longitudinal sectional view of a motor-driven compressor according to a preferred embodiment of the present invention.

The following will describe the embodiments of the motor-driven compressor according to the present invention with reference to the accompanying drawings. As shown in FIG. 1, the motor-driven compressor is generally designated by numeral 1 and includes a housing 2, a compression mechanism 3 compressing refrigerant gas, an electric motor 4 driving the compression mechanism 3 and an inverter assembly 5 controlling the electric motor 4. The compression mechanism 3 and the electric motor 4 are accommodated in the housing 2 and the inverter assembly 5 is fixedly mounted to outer surface 2A of the housing 2. The housing 2 is made of a thermally conductive material such as an aluminum alloy and has formed therethrough an inlet 6. A rear housing that has formed therethrough an outlet 7 is joined to the housing 2.

Referring to FIG. 1, low-temperature and low-pressure refrigerant gas drawn in through the inlet 6 flows through the electric motor 4 and into the compression mechanism 3 to be compressed therein. The refrigerant gas thus compressed is increased in temperature and pressure and discharged through the outlet 7. The inverter assembly 5 is fixed to the outer surface 2A of the housing 2 that is adjacent to a passage of low-temperature and low-pressure refrigerant gas in the housing 2.

Figure 2:
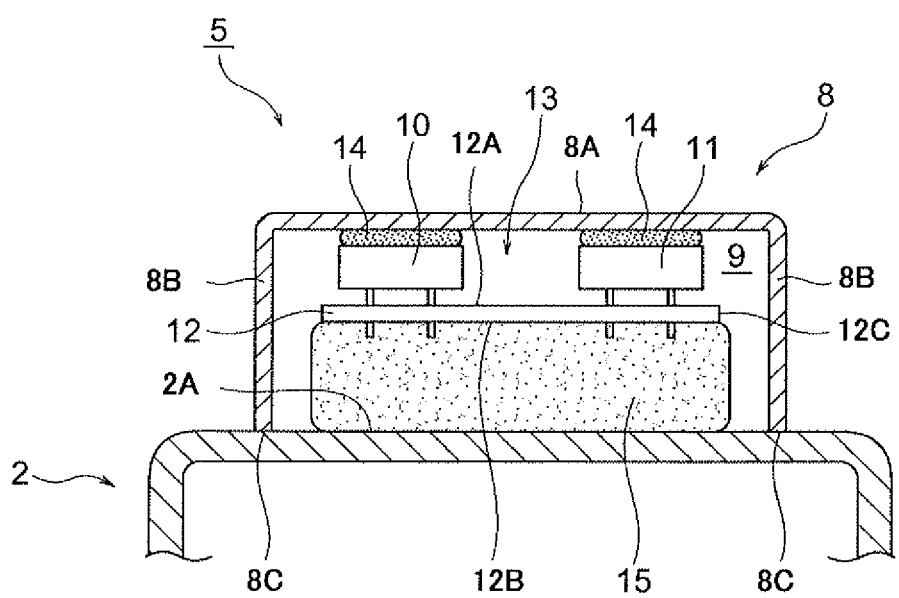
FIG. 2 is a schematic sectional view showing the internal structure of an inverter assembly of the motor-driven compressor of FIG. 1.

As shown in FIG. 2, the inverter assembly 5 includes a base member 8 made of a thermally conductive material such as an aluminum alloy. The base member 8 includes a closed end 8A remote from the housing 2, a peripheral wall 8B and an opened end 8C adjacent to the housing 2. With the opened end 8C of the base member 8 fixed to the outer surface 2A of the housing 2, the closed end 8A, the peripheral wall 8B, the opened end 8C and the outer surface 2A of the housing 2 cooperate to define an accommodation space 9.

The inverter assembly 5 further includes a circuit board 12 disposed in the accommodation space 9. The circuit board 12 has electronic parts 10, 11 mounted on the first surface 12A of the circuit board 12 that faces the closed end 8A of the base member 8. The electronic parts 10, 11 of the circuit board 12 are fixed to the closed end 8A of the base member 8 through thermally conductive glue 14. As shown in FIG. 2, a space 13 is formed between the first surface 12A of the circuit board 12 and the closed end 8A of the base member 8.

An elastic member 15 made of a thermally conductive gel material, e.g. silicon, is provided between the second surface 12B of the circuit board 12 that faces the outer surface 2A of the housing 2 and the outer surface 2A of the housing 2. In other words, the elastic member 15 is in direct contact with the circuit board 12 and the housing 2. In the assembling of the inverter assembly 5, the elastic member 15 that is fluid in its initial state is poured into between the second surface 12B of the circuit board 12 that faces the outer surface 2A of the housing 2 and the outer surface 2A of the housing 2 and allowed to be cured into an elastic gel state over time, with the result that the circuit board 12 is supported directly by the elastic member 15.

The following will describe the operation of the inverter assembly 5 of the motor-driven compressor 1. During the operation of the motor-driven compressor 1, the heat generated by the electronic parts 10, 11 and the circuit board 12 is transferred from the second surface 12B of the circuit board 12 to the outer surface 2A of the housing 2 through the elastic member 15. As described earlier, the inverter assembly 5 is fixed to the outer surface 2A of the housing 2 that is adjacent to a passage through which low-temperature and low-pressure refrigerant gas flows, so that the heat generated by the electronic parts 10, 11 and the circuit board 12 is released from the outer surface 2A of the housing 2. The heat of the electronic parts 10, 11 is also transferred to the outer surface 2A of the housing 2 through the glue 14 that is made of a thermally conductive material, the closed end 8A and the peripheral wall 8B of the base member 8 and released from the outer surface 2A of the housing 2. Additionally, the vibration caused by the compression mechanism 3 is absorbed by the elastic member 15.

In the inverter assembly 5 of the motor-driven compressor 1 according to the above embodiment, the thermally conductive elastic member 15 is provided in the space between the second surface 12B of the circuit board 12 and the outer surface 2A of the housing 2. The heat generated by the electronic parts 10, 11 and the circuit board 12 is transferred through the thermally conductive elastic member 15 to the outer surface 2A of the housing 2 and released therefrom and the vibration caused by the compression mechanism 3 is absorbed by the elastic member 15. Thus, the inverter assembly 5 has high radiation performance and vibration resistance.

Additionally, the elastic member 15 is provided between the second surface 12B of the circuit board 12 and the outer surface 2A of the housing 2, but the space 13 is formed between the first surface 12A of the circuit board 12 and the closed end 8A of the base member 8. This structure of the inverter assembly 5 reduces the amount of the elastic member 15 for use and dispenses with an air hole allowing communication between the accommodation space 9 and the outside air for reducing the pressure change inside the inverter assembly 5, thereby reducing the cost of the inverter assembly 50.

Furthermore, the base member 8 is made of a thermally conductive material such as an aluminum alloy and the electronic parts 10, 11 mounted on the first surface 12A of the circuit board 12 are fixed to the closed end 8A of the base member 8 through the thermally conductive glue 14. Therefore, the heat generated by the electronic parts 10, 11 is also transferred through the glue 14, the closed end 8A and the peripheral wall 8B to the outer surface 2A of the housing 2 and released therefrom, so that radiation performance of the inverter assembly 50 is improved further.

A layer of gel, such as "α-gel" (registered mark) that is in a gel in its original state may serve as the thermally conductive elastic member 15. The use of "α-gel" as the elastic member 15 dispenses with the curing process that is required in a case where the conductive and elastic member 15 is made of a material such as silicon that is fluid in its initial state and cured into an elastic gel state over time.

Figure 3:
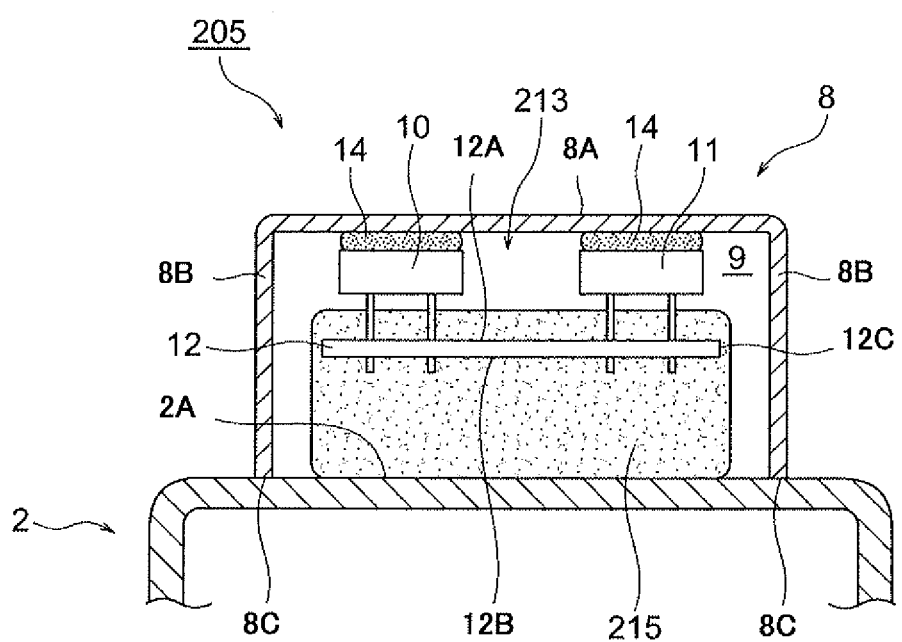
FIG. 3 is a schematic sectional view showing the internal structure of an inverter assembly of a motor-driven compressor according to alternative embodiment of the present invention.

The following will describe an alternative embodiment of the inverter assembly with reference to FIG. 3. The inverter assembly is generally designated by numeral 205. The inverter assembly 205 includes the electronic parts 10, 11, the circuit board 12 and the thermally conductive elastic member 215. The first surface 12A of the circuit board 12 remote from the housing 2 and the side surface 12C of the circuit board 12 are completely covered with the elastic member 215. In other words, the circuit board 12 is completely embedded in the elastic material 215. The space 213 is formed between the surface of the elastic member 215 and the closed end 8A of the base member 8. In this case, the heat generated by the electronic parts 10, 11 and the circuit board 12 is transferred to the outer surface 2A of the housing 2 through the thermally conductive elastic member 215 more efficiently than in the previous embodiment, so that the radiation performance of the inverter assembly 205 is further improved. Additionally, the circuit board 12 is completely covered with the elastic member 215, so that the vibration resistance of the inverter assembly 205 is also improved over the inverter assembly 5 according to the previous embodiment.

In the above embodiments, the thermally conductive glue 14 may be provided by an adhesive sheet that is made of a thermally conductive material.

What is claimed is:

1. A motor-driven compressor comprising:
   a compression mechanism compressing refrigerant gas;
   an electric motor driving the compression mechanism;
   a housing made of a thermally conductive material and accommodating the compression mechanism and the electric motor; and
   an inverter assembly controlling rotation of the electric motor, wherein the inverter assembly includes:
   a circuit board including a first surface and a second surface opposite from the first surface, the second surface facing an outer wall surface of the housing without contacting the housing;
   an elastic member made of a thermally conductive material and disposed in direct contact with the outer wall surface of the housing and in contact with the second surface of the circuit board, so as to be disposed between the circuit board and the outer wall surface of the housing;

a plurality of electronic parts mounted on the first surface of the circuit board, and a base member made of a thermally conductive material, wherein the base member includes a closed end remote from the housing, a peripheral wall, and an opened end fixed to the outer wall surface of the housing, the peripheral wall extending from the closed end to the outer wall surface of the housing, the base member fixing the plurality of electronic parts, wherein the plurality of electronic parts is fixed to the closed end of the base member, wherein the closed end, the peripheral wall and the outer wall surface of the housing define an accommodation space that contains the elastic member, the circuit board and the plurality of electronic parts is disposed inside the accommodation space, wherein the closed end of the base member and the elastic member form therebetween a space, wherein the inverter assembly further includes a glue made of a thermally conductive material or an adhesive sheet made of a thermally conductive material, wherein the plurality of electronic parts is fixed to the closed end of the base member through the glue or the adhesive sheet, wherein the elastic member and the peripheral wall of the base member form therebetween another space so that the elastic member is spaced apart from the peripheral wall of the base member, wherein the elastic member is provided on the second surface of the circuit board and extends along the second surface of the circuit board at an area opposite from an area where the plurality of electronic parts is mounted on the first surface of the circuit board.

2. The motor-driven compressor according to claim 1, wherein the elastic member is made of a gel material.

3. The motor-driven compressor according to claim 1, wherein the elastic member is made of a layer of gel.

4. The motor-driven compressor according to claim 1, wherein the circuit board is completely covered with the elastic member.

* * * * *